(12) United States Patent
Briere et al.

(10) Patent No.: US 6,898,092 B2
(45) Date of Patent: May 24, 2005

(54) EMI FILTER CIRCUIT

(75) Inventors: Michael Briere, West Greenwich, RI (US); Jeffrey Gordon Dumas, West Warnick, RI (US); Bishara Tahhan, Cumberland, RI (US)

(73) Assignee: Picor Corporation, North Smithfield, RI (US)

( * ) Notice: Subject to any disclaimer, the term of this patent is extended or adjusted under 35 U.S.C. 154(b) by 0 days.

(21) Appl. No.: 10/607,511

(22) Filed: Jun. 25, 2003

(65) Prior Publication Data

US 2004/0264220 A1 Dec. 30, 2004

(51) Int. Cl.$^7$ ................................................ H02M 1/12
(52) U.S. Cl. ......................................................... 363/39
(58) Field of Search ............................ 363/39, 40, 44, 363/47

(56) References Cited

U.S. PATENT DOCUMENTS

| | | | |
|---|---|---|---|
| 5,321,373 A | * 6/1994 | Shusterman et al. | ........... 333/12 |
| 5,734,259 A | 3/1998 | Sisson et al. | |
| 5,781,390 A | 7/1998 | Notaro et al. | |
| 5,804,859 A | 9/1998 | Takahashi et al. | |
| 5,831,842 A | 11/1998 | Ogasawara et al. | |
| 5,939,867 A | 8/1999 | Capici et al. | |
| 5,945,816 A | 8/1999 | Marusik | |
| 6,137,267 A | 10/2000 | Kates et al. | |
| 6,232,755 B1 | 5/2001 | Zhang | |
| 6,236,194 B1 | 5/2001 | Manabe et al. | |
| 6,269,011 B1 | 7/2001 | Ohshima | |
| 6,642,672 B2 | * 11/2003 | Hu et al. | ..................... 315/276 |
| 6,775,157 B2 | * 8/2004 | Honda | .......................... 363/39 |
| 2001/0045863 A1 | 11/2001 | Pelly | |

FOREIGN PATENT DOCUMENTS

FR      2 738 086      2/1997

OTHER PUBLICATIONS

N.K. Poon, et al., "Techniques for Input Ripple Current Cancellation: Classification and Implementation," IEEE Transactions on Power Electronics, vol. 15 (6), Nov. 2000, pp. 1144–1152.

L. LaWhite et al., "Design of Active Ripple Filters for Power Circuits in the 1–10 MHz Range," IEEE Transactions on Power Electronics, vol. 3 (3), Jul. 1998, pp. 310–317.

Y-C Son and S-K Sul, "A Novel Active Common–mode EMI Filter for PWM Inverter," Proceedings of the $7^{th}$ IEEE Applied Power Electronics Conference and Exposition 2002, vol. 1, ISBN 0–7803–7404–5, pp. 545–549.

S. Ogasawara et al., "An Active Circuit for Cancellation of Common–Mode Voltage Generated by a PWM Inverter," IEEE Transactions on Power Electronics, vol. 13 (5), Sep. 1998, pp. 835–841.

A.L. Julian et al., "Active Filtering for Common Mode Conducted EMI Reduction in Voltage Source Inverters," IEEE Trans. Industrial Applications, 1998, pp. 934–939.

H.W. Ott, Noise Reduction Techniques in Electronic Systems, John Wiley & Sons, Inc., 1988.

L.E. LaWhite, "Active Filters for 1MHz Power Circuits Under Strict Ripple Limitations," MS Thesis, Massachusetts Institute of Technology, Cambridge, MA, 1987, pp. 1–99.

L.E. LaWhite, M.F. Schlecht, Active Filters for 1–MHz Power Circuits with Strict Input/Output Rippel requirements, IEEE Transactions on Power Electronics, vol. PE–2, No. 4, 1987, pp. 282–290.

* cited by examiner

Primary Examiner—Adolf Berhane
(74) Attorney, Agent, or Firm—Fish & Richardson P.C.

(57) ABSTRACT

Techniques for reducing noise generated by a circuit include a common mode filter and a differential mode filter. The common mode filter includes an input for sensing a common mode signal between a power source and the circuit, an output, and active circuitry for producing an offset signal on the output. The differential mode filter includes an input, an output, and active circuitry for sensing a differential mode signal and producing variations in resistance between the input and output to offset the differential signal.

42 Claims, 5 Drawing Sheets

EMI FILTER CIRCUIT

BACKGROUND

The present disclosure relates to the reduction of electromagnetic emissions and interference ("EMI").

Power supply circuits typically include one or more DC-DC power converters that convert a DC input voltage to a DC output voltage. FIG. 1 shows a conventional power supply system 100 that includes a DC-DC power converter 102 having an input coupled to positive and negative supply rails 105 and 106 to receive power from a power source 101 at a DC input voltage ($V_{in}$) and an input current ($I_{in}$) and an output coupled to supply power to a load 103 at a DC output voltage ($V_{out}$). The converter 102 may provide regulation of the output voltage with changes in load current ($I_{load}$). Many DC-DC converters employ switching techniques, which often produce undesirable EMI. To reduce EMI, EMI shunt capacitors 104 may be connected between a shield, metallic case, or base plate 110 of the converter 102 and one or more of the terminals 105–108. Capacitors 104 create a short path back to the origin for energy capacitively or magnetically coupled to the shield 110.

The shield or base plate 110 may be capacitively or directly connected to a neutral terminal 109*b* (e.g., a chassis ground). Even if directly connected, there will be some amount of resistance and inductance, which is represented by impedance 121 in FIG. 1. Similarly, the negative rail of the power source 101 is directly or capacitively connected at a power distribution panel to the neutral terminal 109*a* (e.g. earth ground) as shown by impedance 120 in FIG. 1. Although neutral terminals 109*a* and 109*b* are connected together, unwanted inductances and resistances often characterize the imperfect connection and are represented by impedance 122 interposed between the two terminals in FIG. 1.

FIG. 2 is a simplified-model of the noise sources in the power converter system 100. The noise current can be represented as a differential-mode current $I_{DM}$ generated by noise current source 112 and flowing between terminals 105 and 106 and a common-mode current $I_{CM}$ generated by noise source 111 and flowing between terminals 105 and 106 and the converter base plate or shield 110 to the chassis or earth ground 109. As shown in FIG. 2 the common mode noise current is capacitively or inductively coupled to terminals 105 and 106 and shield 110. Bypass capacitors 104 shunt some of the differential and common mode noise currents particularly at high frequencies, however, some of the noise current may not be shunted. The circuit path for the differential mode current not shunted by the bypass capacitors 104 is closed through the voltage source 101 and the power distribution system. The circuit path for the common-mode current not shunted by the bypass capacitors 104 is closed through impedances 120, 121, and 122 in the ground system, the voltage source 101 and the power distribution system giving rise to unwanted EMI.

SUMMARY

The invention reduces noise.

Thus, in general, in one aspect, an apparatus features a common mode filter and a differential mode filter to reduce noise from a circuit. The common mode filter includes an input for sensing a common mode signal between a power source and the circuit, an output, and active circuitry for producing an offset signal on the output. The differential mode filter includes an input, an output, and active circuitry for sensing a differential mode signal and producing variations in resistance between the input and output to offset the differential signal.

In general, in another aspect, an apparatus includes a filter for reducing noise generated by a circuit that includes a common mode filter and a controlled impedance return path. The common mode filter includes an input for sensing a common mode signal between a power source and the circuit, an output, and active circuitry for producing an offset signal on the output. The controlled impedance return path includes a first end connected between the power source and the input of the common mode filter and a second end connected to the output of the common mode filter.

Implementations of the apparatuses may include one or more of the following features. The input of the common mode filter may be connected to rails of the power source at a point between the power source and the differential circuit. The differential mode filter output may be connected between the circuit and the power source and the input of the differential mode filter may be connected to the circuit. The input of the common-mode filter may be connected between the power source and the output of the differential mode filter. Bias circuitry may have one input connected to the input of the differential mode filter and a second input connected between the input of the common mode filter and the circuit. The input of the common mode filter may include a transformer having a tertiary winding which produces an output voltage based upon common mode current at the input. The transformer may be a common mode transformer having a first primary winding connected in series with a positive supply rail and a second primary winding connected in series with a negative supply rail. A first amplifier may have an input connected to sense the common mode current at the input of the common mode filter and an output for driving the output of the common mode filter. A capacitance may be connected in series between the output of the amplifier and the output of the common mode filter. The common mode filter may include a closed loop feedback system wherein the filter output tends to drive the common mode input toward zero. The common mode filter may include a return path having a controlled impedance and a first end connected between the power source and the input of the common mode filter and a second end connected to the output of the common mode filter. The controlled impedance may include a series connected capacitor and resistor.

The differential mode filter may include a current sense circuit for generating a signal proportional to the differential-mode current flowing through the output of the differential mode filter and a controlled resistance connected in series with the input and the output of the differential mode filter. The differential mode filter may include a second amplifier circuit having an input connected to the current sense circuit and an output for controlling the controlled resistance. The controlled resistance may be a MOSFET. The differential mode filter may include a closed loop feedback system wherein the filter changes series resistance in a way that tends to drive the differential mode current toward zero.

The circuit may include a switching power converter having a positive and a negative power input terminal. The power source may include a positive and negative line for supply power to the circuit. The input of the common mode filter may include a first input connected between the positive supply line and the positive input terminal and a second input connected between the negative supply line and the negative input terminal. The output of the differential mode filter may be connected to the first input and the input of the differential mode filter is connected to the positive input terminal. The apparatus may include bias circuitry connected to positive and negative terminals for powering the filters. The bias circuitry may provide a return path to the positive and negative terminals for the offset signal. The offset signal may be fed to a shield of the circuit. The offset signal may have a magnitude substantially equal to the magnitude of the common mode signal, and the offset signal may have a polarity opposite to the polarity of the common mode signal.

In general, in another aspect, a method for reducing noise generated by a circuit includes sensing a common mode signal between a power source and the circuit, producing an offset signal for driving a common node, sensing a differential mode signal, and producing variations in resistance between an input and the output to offset the differential signal.

In general, in another aspect, a method for reducing noise generated by a circuit includes sensing a common mode signal between a power source and the circuit, producing an offset signal for driving a common node, and providing a controlled impedance return path having a first end connected between the power source and an input and a second end connected to the common node.

In general, in another aspect a method for reducing noise generated by a circuit provides a common mode filter having an input for sensing a common mode signal between a power source and the circuit, an output, and active circuitry for producing an offset signal on the output. The method includes providing a differential mode filter having an input, an output, and active circuitry for sensing a differential mode signal and producing variations in resistance between the input and output to offset the differential signal.

In general, in another aspect, a method for reducing noise generated by a circuit includes providing a common mode filter having an input for sensing a common mode signal between a power source and the circuit, an output, and active circuitry for producing an offset signal on the output. The method includes providing a controlled impedance return path having a first end for connection between the power source and the input of the common mode filter and a second end for connection to the output of the common mode filter.

Implementations of the methods may include one or more of the following features. The input of the common mode filter may be connected to rails of the power source at a point between the power source and the differential circuit. The differential mode filter output may be connected between the circuit and the power source with the input of the differential mode filter connected to the circuit. The input of the common mode filter may be connected between the power source and the input of the differential mode filter. A first input of a bias circuit may be connected to the input of the differential mode filter and a second input of the bias circuit may be connected between the input of the common mode filter and the circuit. A transformer having a tertiary winding for producing an output voltage based upon common mode current may be provided at the input of the common mode filter. The transformer may have a first primary winding for connection in series with a positive supply rail and a second primary winding for connection in series with a negative supply rail. A first amplifier having an input to sense the common mode current at the input of the common mode filter and an output for driving the output of the common mode filter may be provided. A capacitance may be connected in series between the output of the amplifier and the output of the common mode filter. A closed loop feedback system may be provided in the common mode filter wherein the filter output tends to drive the common mode input toward zero. A return path for the common mode filter having a first end for connection between the power source and the input of the common mode filter and a second end for connection to the output of the common mode filter may be provided. A series connected capacitor and resistor may be provided for the controlled impedance.

A current sense circuit may be provided for the differential mode filter for generating a signal proportional to the differential-mode current flowing through the output of the differential mode filter and a controlled resistance may be connected in series with the input and the output of the differential mode filter. A second amplifier having an input for receiving the signal and an output for controlling the controlled resistance may be provided for the differential mode filter. A MOSFET may be provided for the controlled resistance. A closed loop feedback system may be provided in the differential mode filter wherein the filter changes series resistance in a way that tends to drive the differential mode current toward zero. The circuit may be a switching power converter having a positive and a negative power input terminal. The power source may have positive and negative lines for supply power to the circuit. A first input of the common mode filter may be connected between the positive supply line and the positive input terminal and a second input of the common mode filter may be connected between the negative supply line and the negative input terminal. The output of the differential mode filter may be connected to the first input. The input of the differential mode filter may be connected to the positive input terminal and bias circuitry may be connected to the positive and negative terminals for powering the filters. A return path for the offset signal may be provided to the positive and negative terminals. The offset signal may be feed to a shield of the circuit.

The details of one or more embodiments of the invention are set forth in the accompanying drawings and the description below. Other features, and advantages of the invention will be apparent from the description and drawings, and from the claims.

BRIEF DESCRIPTION OF THE DRAWINGS

Like reference symbols in the various drawings indicate like elements.

DETAILED DESCRIPTION

Figure 3:
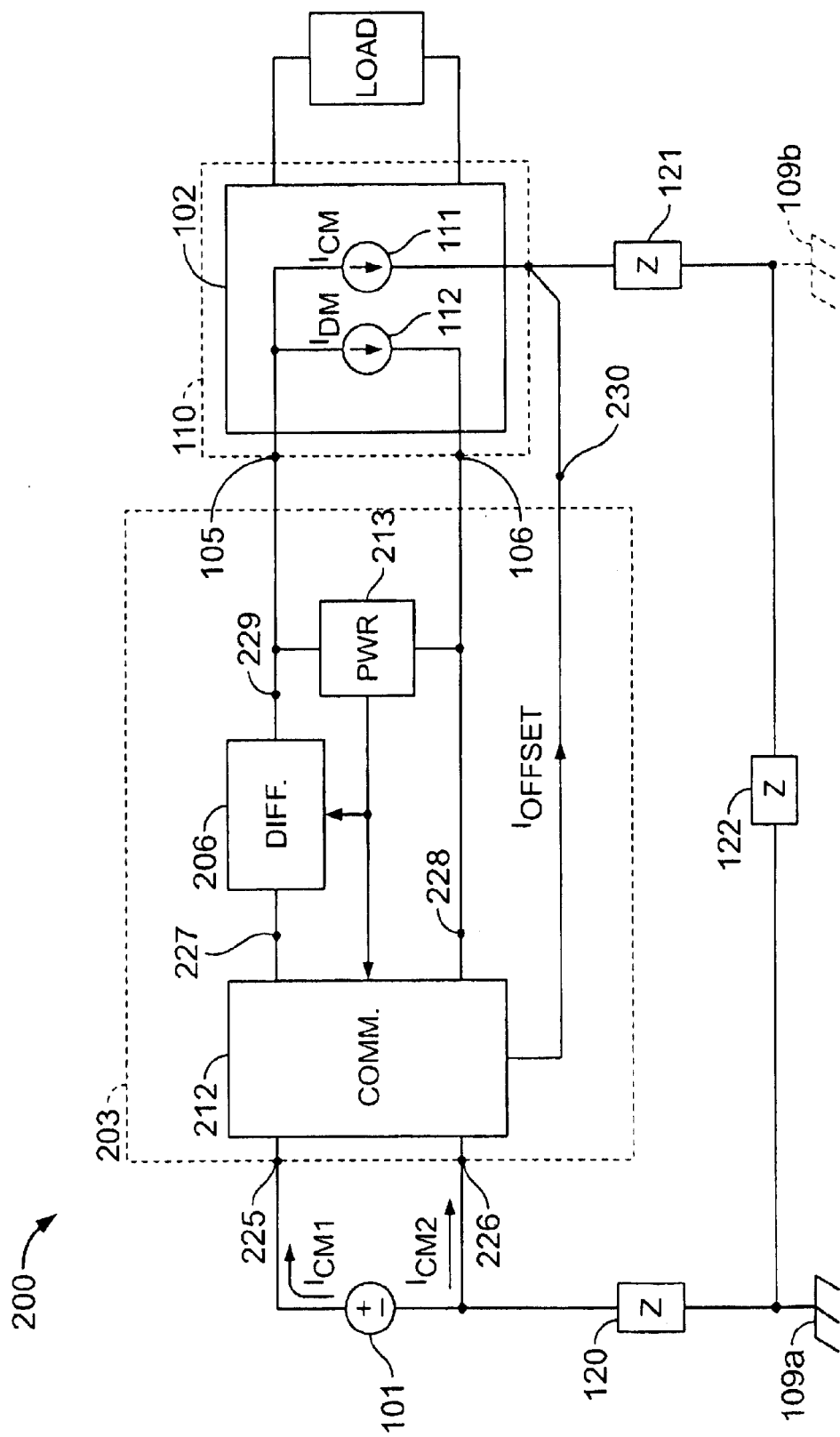
FIG. 3 is block diagram of a power converter system employing an EMI filter circuit according to an embodiment of the application.

FIG. 3 is a block diagram of a converter system 200 including a converter circuit 102 and an EMI filter circuit 203. The EMI filter circuit 203 includes a differential-mode current-filter circuit 206, a common-mode current-filter circuit 212, and a power supply circuit 213 according to an embodiment of the application. In FIG. 3, power flows from left to right from the power source 101 through the common-mode filter 212 and then through the differential-mode filter 206 to the filter power supply circuit 213 and power converter 102. The noise, in contrast, conceptually flows from right to left from the power converter 102 to the filters. The active filters 206 and 212 provide closed-loop feedback control of the noise injected into the power distribution system.

The common-mode circuit 212 senses the common-mode current $I_{CM}$ flowing between the power converter and the voltage source 101 and produces an offset current, $I_{offset}$, having characteristics to cancel the common-mode noise current $I_{CM}$. The common-mode filter 212 drives the base plate or shield 110 with the offset current to cancel the common-mode noise current at the source, preventing the common-mode noise current, $I_{CM}$, from coupling with the power distribution system 101 and reducing EMI.

The differential-mode filter circuit 206 is coupled in series between the common-mode filter and the power converter 102. The differential-mode circuit 206 senses the differential-mode noise current $I_{DM}$ flowing in one of the supply rails and alters its series resistance to minimize or cancel the differential-mode noise current as discussed further below in connection with FIG. 5.

A power supply 213 for the filter circuitry is connected at the power converter side of the filters to prevent any noise from being conducted through supply 213 to the power source 101. In other words, current for powering the filters and offsetting the common-mode current is pulled from the noisy side of the filters 229, 228 to prevent injection of noise through the power supply circuit 213 into the filtered nodes 225, 226.

Figure 4:
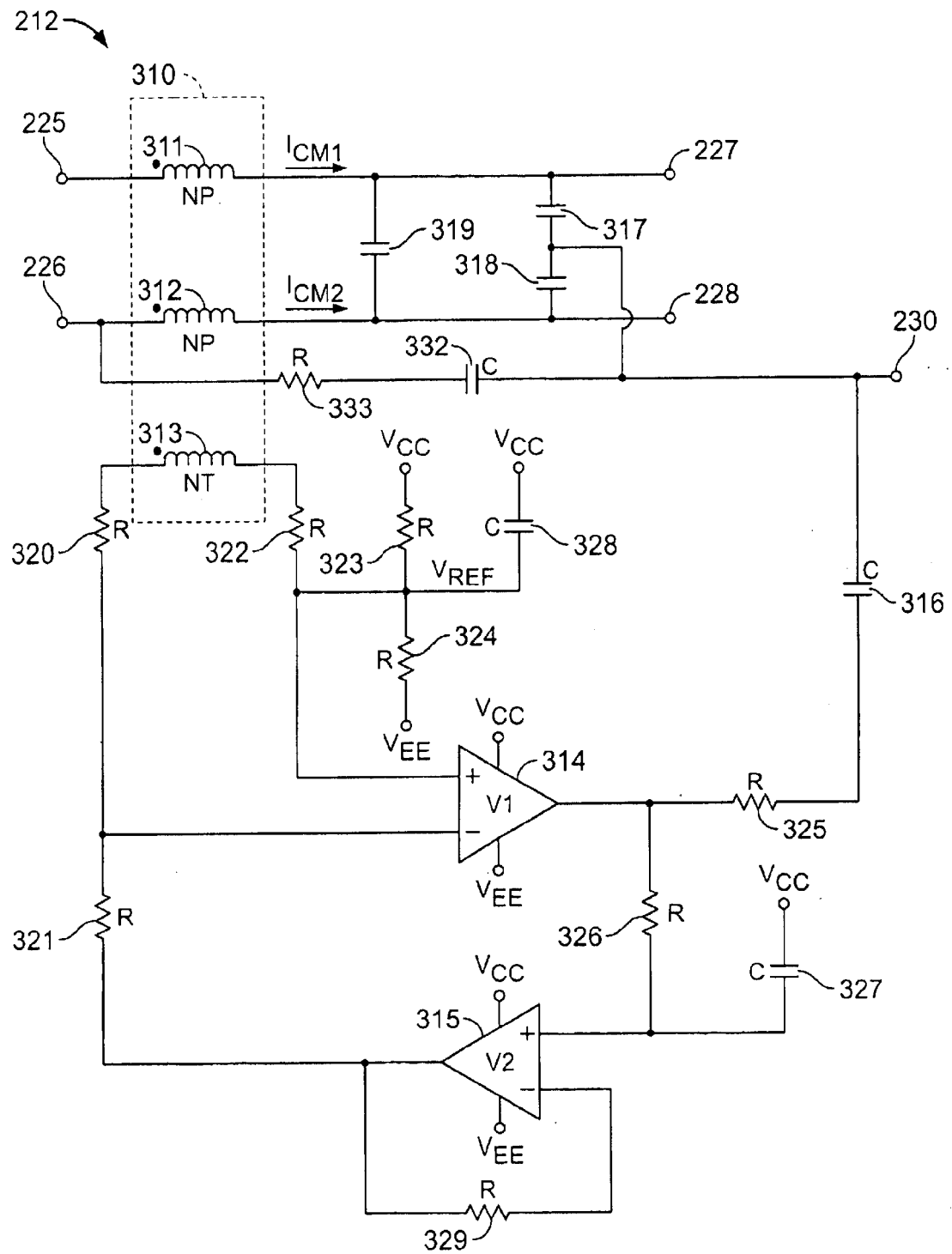
FIG. 4 is a circuit diagram of a common-mode filter circuit according to an embodiment of the application.

FIG. 4 is a circuit diagram of a common-mode filter circuit 212 according to an embodiment. The filter circuit 212 includes a common-mode transformer 310 coupled in series between terminals 225, 226 and terminals 227, 228, respectively. Transformer 310 includes three coupled windings: a first primary winding 311, a second primary 312, and a tertiary winding 313. As shown in FIG. 4, the winding polarities (indicated with a "DOT" reference) are such that currents flowing from 225 to 227 in winding 311 are aided by currents flowing from 226 to 227 in winding 312 and induce corresponding signals in winding 313. The two primary windings 311 and 312 have the same number of turns $N_p$ so that any differential currents will cancel (as a function of the coupling coefficient between the windings) producing no signal in the tertiary winding 313. The transformer therefore acts as a common-mode current sense element detecting the presence of common-mode AC current, $I_{CM}$, and producing a resultant differential voltage across the tertiary winding 313. The tertiary winding 313 may have a number of turns $N_T$ greater than the number of turns, $N_p$, in the primary windings to provide amplification of the common-mode signal. The resultant voltage is induced due to common-mode current $I_{CM1}$, $I_{CM2}$ flowing through either or both of the primary windings 311 or 312, respectively.

A voltage proportional to the common-mode current is induced in the tertiary winding 313 and amplified by amplifier 314. In FIG. 4, the output of amplifier 314 is coupled through capacitor 316 to the filter output 230 which is connected to the shield or base plate 110 of the power converter 102 (or to the common node 109b for systems in which the converter lacks a case, shield or baseplate). Capacitive coupling provides the isolation necessary for many applications and to meet safety standards. Amplifier 314 modulates the voltage across capacitor 316, to produce an offset current, $I_{offset}$, substantially equal to the magnitude of the common-mode current $I_{CM}$ but opposite in polarity or phase. As a result, the common-mode filter circuit 212 effectively reduces the common-mode current $I_{CM}$ present at the source (the power converter base plate or shield 110), which would have been conducted to the common node terminal 109b and back toward the power distribution system, substantially eliminating EMI that would have resulted from that current.

Figure 6:
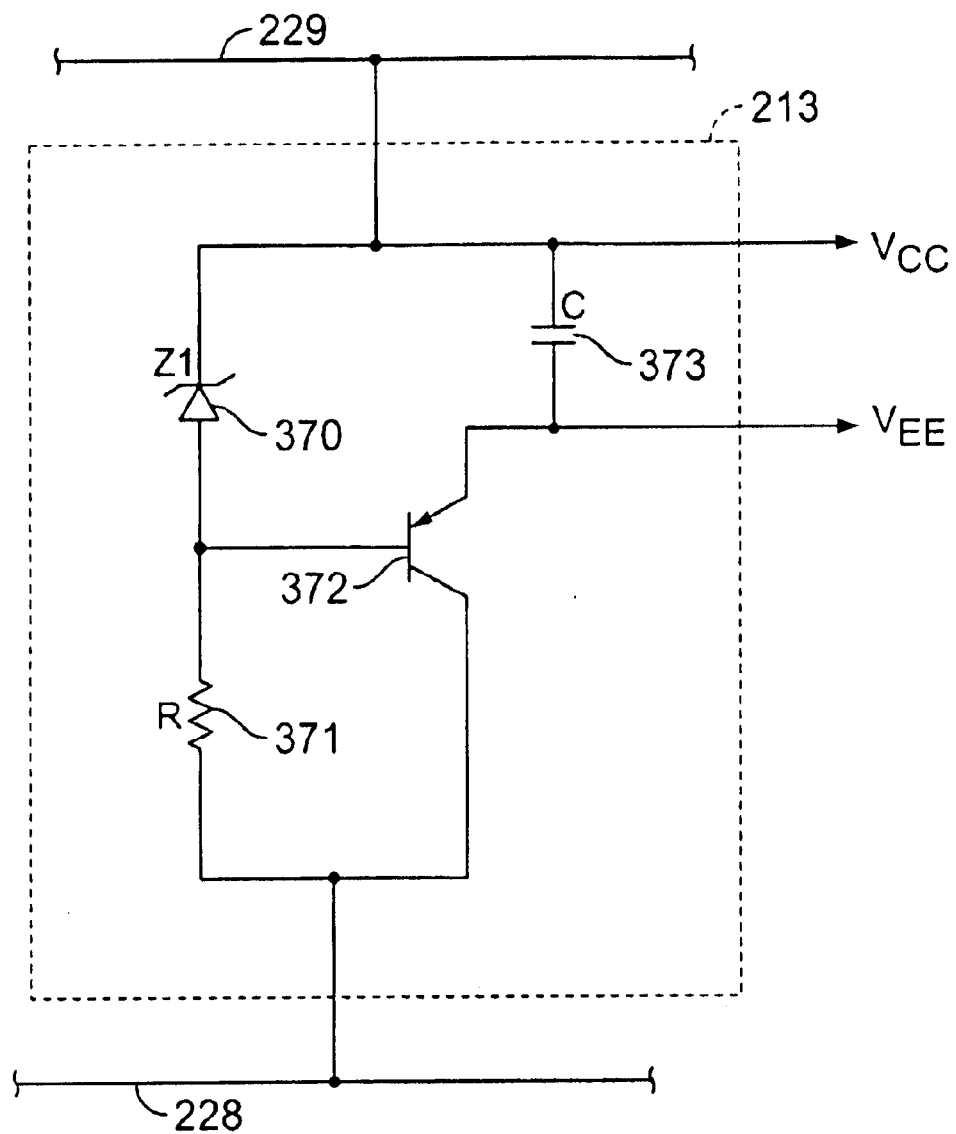
FIG. 6 is a circuit diagram of a bias circuit for the EMI filter circuit.

The DC biasing of the common-mode filter circuit 212 is now described. Referring to FIG. 6, a bias circuit, including zener diode 370, resistor 371, transistor 372, and capacitor 373, establishes a regulated voltage, $V_{EE}$, ($V_{EE}=V_{zener}-V_{be}$) below the positive supply rail 229, $V_{CC}$. These two voltages, $V_{CC}$ and $V_{EE}$ respectively establish the positive and negative voltage supply rails to power the active filter circuitry of the common-mode filter 212 and differential-mode filter 206. The difference between the two voltages must be large enough (e.g. 8 Volts) to provide the filter circuitry with enough headroom to produce the requisite voltage swing across capacitor 316 to cancel the common mode current. Referring to FIG. 4, the DC operating point for the common-mode filter circuit 212 is established by resistors 323, 324 forming a voltage divider establishing a voltage, $V_{REF}$, halfway between the $V_{CC}$ and $V_{EE}$ rails which is fed to the non-inverting input of amplifier 314. Capacitor 328 helps improve the noise immunity of $V_{REF}$. Amplifier 315 senses the output voltage of amplifier 314 and adjusts the current through resistors 320, 321 (and thus the voltage at the inverting input pin (−) of amplifier 314) until the output voltage of amplifier 314 equals reference voltage $V_{Ref}$. Capacitor 327 and resistor 326 help to maintain the output voltage of amplifier 315 static in the presence of AC voltages at the output of amplifier 314. Biasing amplifier 314 in this manner may allow common-mode filter circuit 212 to compensate for DC drops in the common-mode sense element (i.e., primary windings 311, 312) due to varying DC differential current levels and parametric shifts in the transformer 310, and the DC resistance of the windings, as well as the input offset voltage of amplifier 314. In addition, biasing the output of amplifier 314 halfway between the rails may increase the dynamic range of the amplifier. Alternatively other biasing schemes may be used.

The AC operation of the common-mode filter 212 is now described. When a common-mode current, $I_{CM}$, (relative to terminal 109a) flows through either or both of the primary windings 311, 312, an AC differential voltage will be induced in the tertiary winding 313. The voltage across winding 313 will be proportional in magnitude to $I_{CM}$ and can be multiplied by the turns ratio $N_p/N_T$. The tertiary voltage is input to amplifier 314 through resistors 320, 322, amplified, and used to drive the power converter shield or base plate 110. The output of amplifier 314 thus drives the power converter shield or base plate 110 through capacitor 316 supplying the offset current, $I_{offset}$, which is equal in magnitude and opposite in polarity to $I_{CM}$. The offset current therefore acts to prevent the common-mode current $I_{CM}$ from flowing through the power delivery system 101.

As an illustration, the common-mode current using filter 212 will flow along a path from the converter base plate or shield 110, out terminal 105, through the positive filter supply rail $V_{CC}$, through amplifier 314, through the output of amplifier 314, through resistor 325 and capacitor 316, and back to the base plate or shield 110. In the opposite direction, the common-mode current flows from the shield or base plate 110, through capacitor 316 and resistor 325, through amplifier 314 to the negative filter supply rail $V_{EE}$, through capacitor 373 in the bias circuit 213 and back to terminal 105. Capacitor 319 in FIG. 4 provides a low impedance path between terminals 105 and 106 for the noise current. This allows cancellation of common-mode current $I_{CM}$ coupling either terminal.

Capacitors 317 and 318 each have one end coupled to the output of the common-mode filter 230 and another end to the positive and negative supply rails 227 and 228. Capacitors 317 and 318 provide a low impedance shunt and the inductance of the transformer primary windings 311, 312 provide a high series impedance to and thereby attenuating noise at high frequencies to accommodate the finite gain-bandwidth of the active portion of the filter, such as amplifiers 314 and 315.

Capacitor 332 and damping resistor 333 are used to connect the converter shield or base plate to the common supply rail 226 on the voltage source 101 side of the filter 212. This helps keep the voltage between the shield or base plate 110 and supply rail 226 constant and thus minimizes the loss of drive voltage across capacitor 316 that could otherwise occur due to impedances 120, 121, and 122. Capacitor 332 therefore also functions as a common mode filter element bypassing impedances 120, 121, 122. Resistor 333 reduces the Q of the filter thereby reducing resonant peaking.

"Recirculating" the common-mode current as described above may include losses, in part due to the finite impedance of the capacitors 316 (FIG. 4) and 373 (FIG. 6), which may result in the creation of a differential current $I_{DM}$. Also, the ability of transformer 310 to differentiate between common-mode current ICM and differential-mode current $I_{DM}$ may be limited by an imperfect coupling coefficient. A portion of the differential current $I_{DM}$ that flows though transformer 310 may produce an undesirable signal in the tertiary winding 313, be "misinterpreted" as common-mode, produce an error in the offset current, and result in incomplete cancellation of the common-mode current or even generation of a common-mode current. To minimize these errors, a differential-mode filter 206 is inserted between the power converter and the common-mode filter 212 to attenuate the differential-mode current before it flows through transformer 310.

Figure 5:
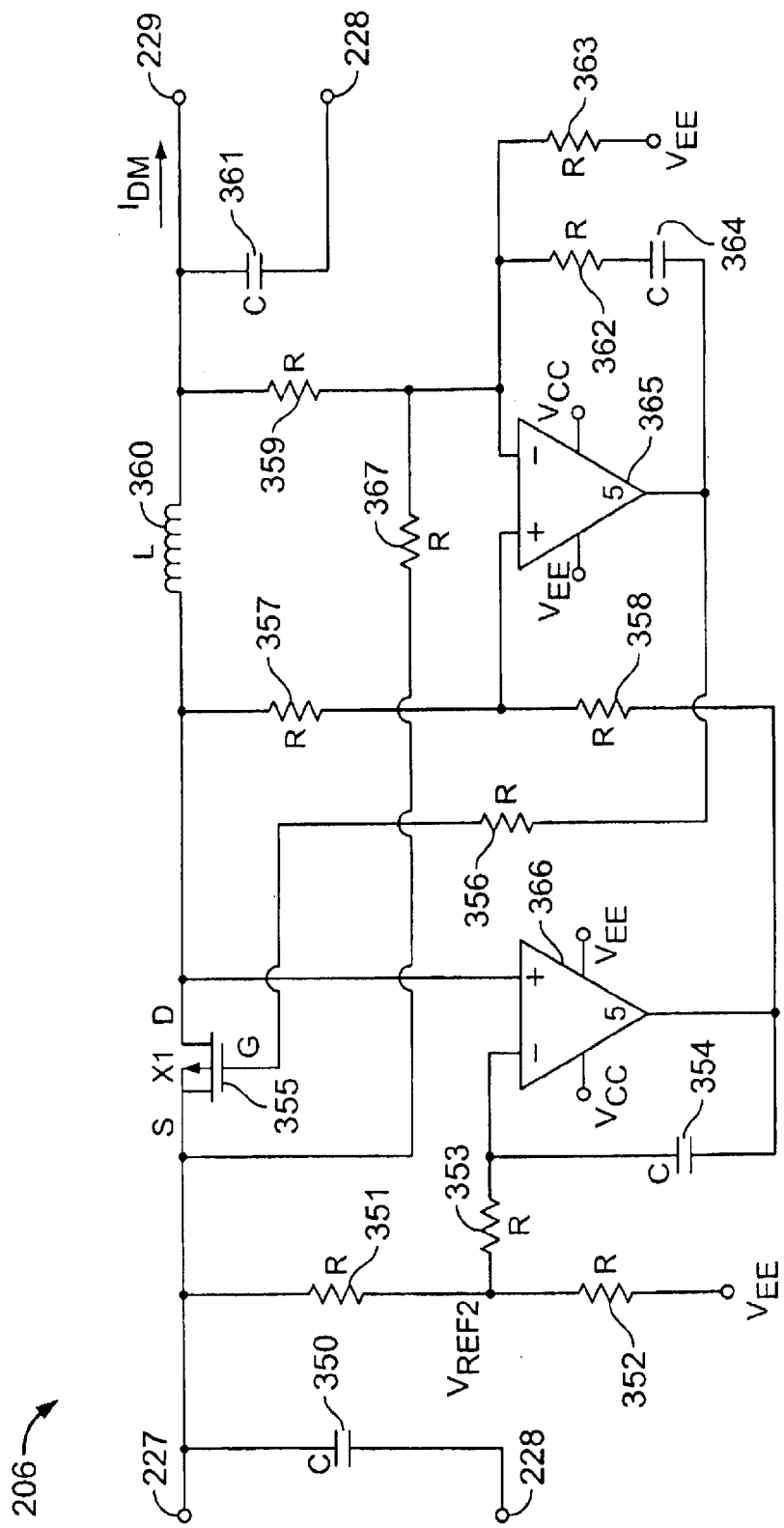
FIG. 5 is a circuit diagram of a differential-mode filter circuit according to an embodiment of the application.

FIG. 5 is a block diagram of an active differential-mode current filter circuit 206 according to an embodiment of the application. The filter 206 attenuates ripple noise current generated by the power converter which would otherwise be conducted back toward the power source 101. An amplifier 365 modulates the drain to source resistance $R_{ds}$ of a pass transistor 355 connected in series with the positive supply rail to the power converter 102. Transistor 355 may be a field effect transistor or MOSFET. The resistance of the pass transistor is increased as the ripple current increases and decreased as the ripple current decreases, in effect acting as an inductance and providing a high series AC impedance between the power converter and the power source 101. A shunt capacitor 361, which may include the input capacitance or hold up capacitance of the power converter 102, provides a low impedance shunt path for the ripple noise current.

Referring to FIG. 5, the source ("S") of transistor 355 is connected to the positive supply rail 227 from the power source 101, or, in the case of FIG. 3, from the common-mode filter 212. The drain of transistor 355 is connected to a sense inductor 360 which is connected to supply current to the power converter 102. Amplifier 366 establishes the DC drain-to-source voltage $V_{DS}$ of transistor 355. A voltage divider (resistors 351 and 352), connected between the source of transistor 355 and the negative filter supply rail $V_{EE}$, establishes a reference voltage $V_{REF2}$ approximately a few tenths of a volt below the source voltage. Reference voltage $V_{REF2}$ is presented to the inverting input pin ("−") of amplifier 366 through passive resistor 353. The non-inverting input pin ("+") of amplifier 366 senses the drain voltage of transistor 355.

If the drain voltage of transistor 355 ("D") is lower than reference voltage $V_{REF2}$, the output of amplifier 366 is pulled low. This lowers the voltage at the non-inverting pin ("+") of amplifier 365 causing the output of amplifier 365 to be pulled lower. As the output of amplifier 365 drops in voltage, the gate-to-source voltage, $V_{GS}$ of transistor 355 is increased causing it to conduct more lowering its resistance and raising the voltage at the drain terminal, until it reaches the reference voltage, $V_{REF2}$. This sets the DC voltage drop, $V_{DS}$ across the pass transistor 355 as well as nulling the input offset voltage across amplifier 365 and the DC voltage drop across the series resistances of inductor 360. Resistor 363 and 367 set a minimum offset voltage across amplifier 365 to help ensure that amplifier 366 must pull low in order to bias amplifier 365 because amplifier 365 can not provide an output voltage greater than the positive filter supply voltage, $V_{CC}$. This resistor divider also functions to provide rapid dc bias feedback to amplifier 365 in the event of a differential step load change to help ensure that device 355 remains within its dynamic operating range. The gain of amplifier 366 is set by resistor 353 and capacitor 354 to allow maximum gain at DC and a gain of 1 at frequencies greater than 1 Hz.

The AC operation of filter circuit 206 is now described. As differential ripple noise $I_{dm}$ increases, the voltage at 229 decreases as capacitor 361 discharges. The non-inverting (+) input of amplifier 365 will in turn be biased slightly greater than its inverting (−) input driving the output of amplifier 365 higher. This decreases the gate-to-source voltage $V_{gs}$ of series pass transistor 355 increasing its drain resistance $R_{ds}$ and causing its drain voltage $V_d$ to fall. Thus the AC voltage across sense device L1, and the ac current through it, is held near zero. Ripple noise current at relatively high frequencies is attenuated by LC filter comprised of current sense element 360 and capacitor 361. Resistor 362, capacitor 364, and resistor 356 ensure adequate active loop gain and phase margin for amplifier 365.

In one embodiment, amplifiers 314, 315, 366 and 365 can be implemented using operational amplifiers (OPAMPS) or other active amplifier circuits. Although the filter circuits 206 and 212 were described in the context of power converter circuits, these techniques can be used in other power supply circuits such as AC-DC converter circuits, AC-DC converter circuits or other power supply circuits.

Other implementations are within the scope of the following claims.

What is claimed is:

1. A filter apparatus for reducing noise generated by a circuit comprising:
   a common mode filter having an input for sensing a common mode signal between a power source and the circuit, an output, and active circuitry for producing an offset signal on the output; and
   a differential mode filter having an input, an output, and active circuitry for sensing a differential mode signal and producing variations in resistance between the input and output to offset the differential signal.

2. The apparatus of claim 1 wherein:
the input of the common mode filter is connected to rails of the power source at a point between the power source and the differential circuit.

3. The apparatus of claim 1 wherein:
the differential mode filter is connected between the circuit and the power source and the input of the differential mode filter is connected to the circuit.

4. The apparatus of claim 3 wherein:
the input of the common-mode filter is connected between the power source and the input of the differential mode filter.

5. The apparatus of claim 4 further comprising:
bias circuitry having one input connected to the input of the differential mode filter and a second input connected between the input of the common mode filter and the circuit.

6. A filter apparatus for reducing noise generated by a circuit comprising:
a common mode filter having an input for sensing a common mode signal between a power source and the circuit, an output, and active circuitry for producing an offset signal on the output; and
a controlled impedance return path having a first end connected between the power source and the input of the common mode filter and a second end connected to the output of the common mode filter.

7. The apparatus of claim 1 or 6 wherein:
the input of the common mode filter comprises a transformer, the transformer having a tertiary winding which produces an output voltage based upon common mode current at the input of the common mode filter.

8. The apparatus of claim 7 wherein:
the transformer comprises a common mode transformer having a first primary winding connected in series with a positive supply rail and a second primary winding connected in series with a negative supply rail.

9. The apparatus of claim 1 or 6 further comprising:
a first amplifier having an input connected to sense the common mode current at the input of the common mode filter and an output for driving the output of the common mode filter.

10. The apparatus of claim 9 further comprising:
a capacitance connected in series between the output of the amplifier and the output of the common mode filter.

11. The apparatus of claim 1 or 6 wherein:
the common mode filter comprises a closed loop feedback system in which the filter output tends to drive the common mode input toward zero.

12. The apparatus of claim 1 wherein:
the common mode filter further comprises a controlled impedance return path having a first end connected between the power source and the input of the common mode filter and a second end connected to the output of the common mode filter.

13. The apparatus of claim 6 or 12 wherein:
the controlled impedance further comprises a series connected capacitor and resistor.

14. The apparatus of claim 1 wherein:
the differential mode filter further comprises a current sense circuit for generating a signal proportional to the differential-mode current flowing through the output of the differential mode filter and a controlled resistance connected in series with the input and the output of the differential mode filter.

15. The apparatus of claim 14 wherein:
the differential mode filter further comprises a second amplifier circuit having an input connected to the current sense circuit and an output for controlling the controlled resistance.

16. The apparatus of claim 15 wherein:
the controlled resistance comprises a MOSFET.

17. The apparatus of claim 1 wherein:
the differential mode filter comprises a closed loop feedback system in which the filter changes series resistance in a way that tends to drive the differential mode current toward zero.

18. The apparatus of claim 1 wherein:
the circuit comprises a switching power converter having a positive and a negative power input terminal;
the power source further comprises a positive and a negative lines for supply power to the circuit;
the input of the common mode filter further comprises a first input connected between the positive supply line and the positive input terminal and a second input connected between the negative supply line and the negative input terminal;
the output of the differential mode filter is connected to the first input and the input of the differential mode filter is connected to the positive input terminal; and
further comprising:
bias circuitry connected to positive and negative terminals for powering the filters;
the bias circuitry providing a return path to the positive and negative terminals for the offset signal.

19. The apparatus of claim 1 or 6 wherein:
the offset signal is fed to a shield of the circuit.

20. The apparatus of claim 1 or 6 wherein:
the offset signal has a magnitude substantially equal to the magnitude of the common mode signal.

21. The apparatus of claim 1 or 6 wherein:
the offset signal has a polarity opposite to the polarity of the common mode signal.

22. A method for reducing noise generated by a circuit comprising:
providing a common mode filter having an input for sensing a common mode signal between a power source and the circuit, an output, and active circuitry for producing an offset signal on the output; and
providing a differential mode filter having an input, an output, and active circuitry for sensing a differential mode signal and producing variations in resistance between the input and output to offset the differential signal.

23. The method of claim 22 further comprising:
connecting the input of the common mode filter to rails of the power source at a point between the power source and the differential circuit.

24. The method of claim 22 further comprising:
connecting the differential mode filter between the circuit and the power source with the input of the differential mode filter connected to the circuit.

25. The method of claim 24 further comprising:
connecting the input of the common mode filter between the power source and the output of the differential mode filter.

26. The method of claim 25 further comprising:
connecting a first input of a bias circuitry to the input of the differential mode filter and connecting a second input of the bias circuitry between the input of the common mode filter and the circuit.

27. A method of reducing noise generated by a circuit comprising:

providing a common mode filter having an input for sensing a common mode signal between a power source and the circuit, an output, and active circuitry for producing an offset signal on the output; and providing a controlled impedance return path having a first end for connection between the power source and the input of the common mode filter and a second end for connection to the output of the common mode filter.

28. The method of claim 22 or 27 further comprising:

providing a transformer at the input of the common mode filter, the transformer having a tertiary winding for producing an output voltage based upon common mode current at the input of the common mode filter.

29. The method of claim 28 further comprising:

providing the transformer with a first primary winding for connection in series with a positive supply rail and a second primary winding for connection in series with a negative supply rail.

30. The method of claim 22 or 27 further comprising:

providing a first amplifier having an input to sense the common mode current at the input of the common mode filter and an output for driving the output of the common mode filter.

31. The method of claim 30 further comprising:

providing a capacitance in series between the output of the amplifier and the output of the common mode filter.

32. The method of claim 22 or 27 further comprising:

providing a closed loop feedback system in the common mode filter wherein the filter output tends to drive the common mode input toward zero.

33. The method of claim 22 further comprising:

providing a controlled impedance return path for the common mode filter;

providing a first end for connection between the power source and the input of the common mode filter; and providing a second end for connection to the output of the common mode filter.

34. The method of claim 27 or 33 further comprising:

providing a series connected capacitor and resistor for the controlled impedance.

35. The method of claim 22 further comprising:

providing a current sense circuit for the differential mode filter for generating a signal proportional to the differential-mode current flowing through the input of the differential mode filter; and providing a controlled resistance connected in series with the input and the output of the differential mode filter.

36. The method of claim 35 further comprising:

providing a second amplifier circuit for the differential mode filter having an input for receiving the signal and an output for controlling the controlled resistance.

37. The method of claim 36 further comprising:

providing a MOSFET for the controlled resistance.

38. The method of claim 22 further comprising:

providing a closed loop feedback system in the differential mode filter wherein the filter changes series resistance in a way that tends to drive the differential mode current toward zero.

39. The method of claim 22 wherein:

the circuit comprises a switching power converter having a positive and a negative power input terminal;

the power source further comprises a positive and a negative lines for supply power to the circuit; and further comprising connecting a first input of the common mode filter between the positive supply line and the positive input terminal;

connecting a second input of the common mode filter between the negative supply line and the negative input terminal;

connecting the output of the differential mode filter to the first input;

connecting the input of the differential mode filter to the positive input terminal;

providing bias circuitry connected to the positive and negative terminals for powering the filters; and providing a return path for the offset signal to the positive and negative terminals.

40. The method of claim 22 or 27 further comprising:

feeding the offset signal to a shield of the circuit.

41. A method of reducing noise generated by a circuit comprising:

sensing a common mode signal between a power source and the circuit;

producing an offset signal for driving a common node;

sensing a differential mode signal; and producing variations in resistance between an input and the output to offset the differential signal.

42. A method of reducing noise generated by a circuit comprising:

sensing a common mode signal between a power source and the circuit;

producing an offset signal for driving a common node; and providing a controlled impedance return path having a first end connected between the power source and an input and a second end connected to the common node.

* * * * *

UNITED STATES PATENT AND TRADEMARK OFFICE
CERTIFICATE OF CORRECTION

| | | |
|---|---|---|
| PATENT NO. | : 6,898,092 B2 | Page 1 of 1 |
| APPLICATION NO. | : 10/607511 | |
| DATED | : May 24, 2005 | |
| INVENTOR(S) | : Michael Briere, Jeffrey Gordon Dumas and Bishara Tahhan | |

It is certified that error appears in the above-identified patent and that said Letters Patent is hereby corrected as shown below:

Title page,
Item [56], References Cited, OTHER PUBLICATIONS,
"L.E. LaWhite and M.F. Schlecht" reference, replace "Rippel" with -- Ripple --.

Figure 1:
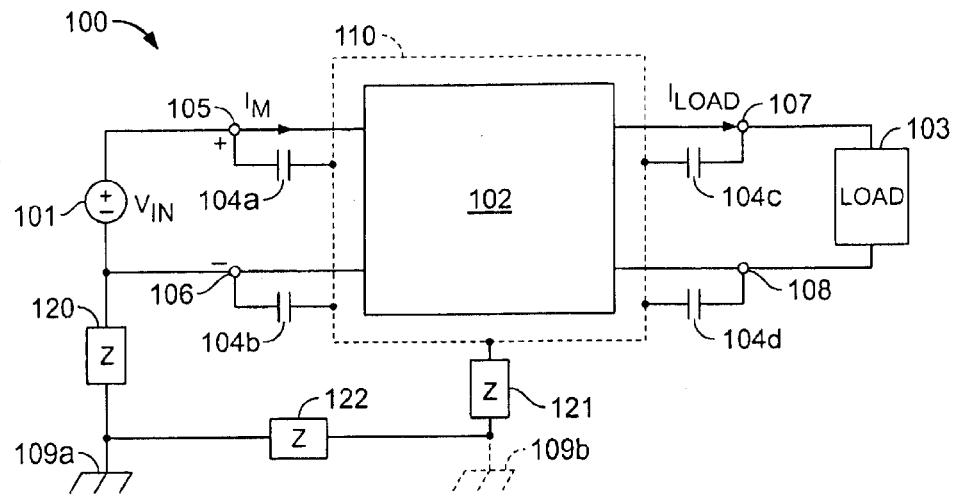
FIG. 1 is a block diagram of a conventional power converter system.
Figure 2:
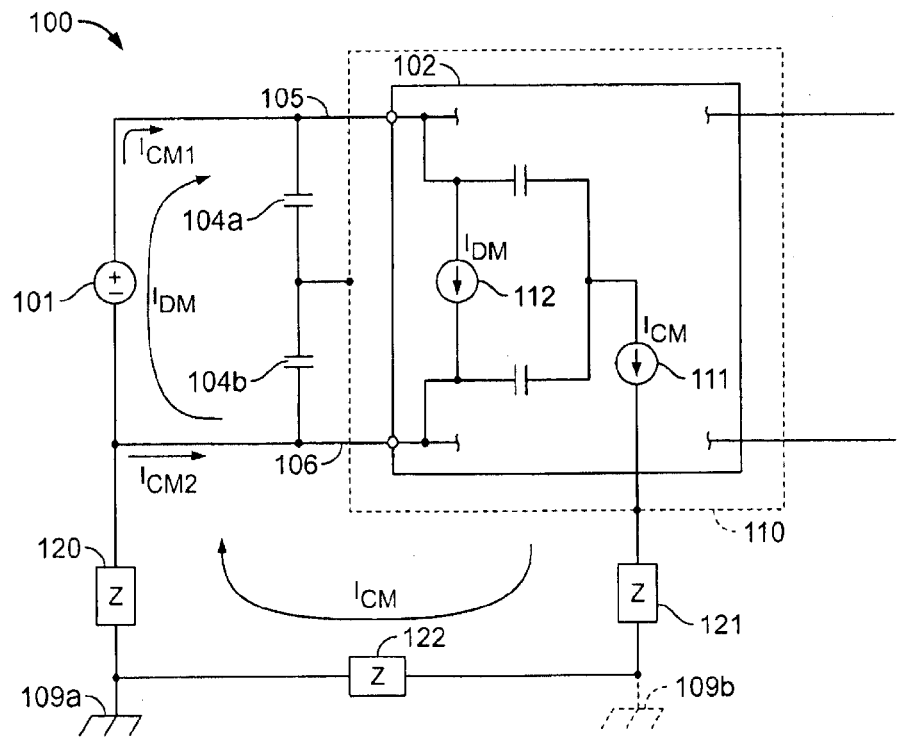
FIG. 2 is a block diagram of a conventional power converter system showing common-mode and differential-mode currents.

Drawings,
Figure 1, "$I_M$" should be -- $I_{IN}$ --.

Column 6,
Line 54, "ratio $N_P/N_T$" should be -- ratio $N_T/N_P$ --.

Column 8,
Line 43, "device Ll" should be -- device L --.

Column 10,
Line 18, "negative lines" should be -- negative line --.

Signed and Sealed this

Twentieth Day of June, 2006

JON W. DUDAS
*Director of the United States Patent and Trademark Office*